(12) United States Patent
Pyanet et al.

(10) Patent No.: US 12,731,405 B2
(45) Date of Patent: Sep. 8, 2026

(54) METHOD AND SYSTEM FOR DAYTIME INFRARED SPACE SURVEILLANCE

(71) Applicant: ARIANEGROUP SAS, Les Mureaux (FR)

(72) Inventors: Marine Pyanet, Les Mureaux (FR); Théo Joffre, Les Mureaux (FR); Pascal Richard, Toulouse Cedex (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/997,313

(22) PCT Filed: Jul. 21, 2023

(86) PCT No.: PCT/FR2023/051139
§ 371 (c)(1),
(2) Date: Jan. 21, 2025

(87) PCT Pub. No.: WO2024/018164
PCT Pub. Date: Jan. 25, 2024

(65) Prior Publication Data

US 2026/0030891 A1 Jan. 29, 2026

(30) Foreign Application Priority Data

Jul. 21, 2022 (FR) ...................................... 2207482

(51) Int. Cl.
*G06V 10/762* (2022.01)
*G06V 10/147* (2022.01)
(Continued)

(52) U.S. Cl.
CPC ............ *G06V 20/52* (2022.01); *G06V 10/147* (2022.01); *G06V 10/36* (2022.01); *G06V 10/762* (2022.01);
(Continued)

(58) Field of Classification Search
CPC ...... G06V 20/52; G06V 10/147; G06V 10/36; G06V 10/762; G06V 10/764; G06V 10/774; G06V 10/82; G06V 10/98; H04N 23/20
(Continued)

(56) References Cited

U.S. PATENT DOCUMENTS 5,657,251 A * 8/1997 Fiala ..................... G01S 13/726 342/162
7,349,804 B2 * 3/2008 Belenkii ............. G01C 21/025 701/523
(Continued)

OTHER PUBLICATIONS

Deng Qiuqun et al: "Multi-Scale Convolutional Neural Networks for Space Infrared Point Objects Discrimination", IEEE Access, vol. 7, Mar. 18, 2019(Mar. 18, 2019), pp. 28113-28123, XP011715159, DOI: 10.1109/ACCESS.2019.2898028.
(Continued)

*Primary Examiner* — Helen Shibru
(74) *Attorney, Agent, or Firm* — Bookoff McAndrews, PLLC

(57) ABSTRACT

A space surveillance method for detecting space objects in orbit around the Earth in images captured during the daytime, the method including the following steps: capturing a plurality of infrared images of the daytime sky using a camera including at least one infrared sensor, detecting space objects in orbit around the Earth on the basis of the images, the detection of bright spots being implemented by a deep-learning artificial intelligence system, and identifying each object detected from a catalogue of known space objects in orbit around the Earth.

8 Claims, 2 Drawing Sheets

(51) Int. Cl.

| | |
|---|---|
| ***G06V 10/36*** | (2022.01) |
| ***G06V 10/764*** | (2022.01) |
| ***G06V 10/774*** | (2022.01) |
| ***G06V 10/82*** | (2022.01) |
| ***G06V 10/98*** | (2022.01) |
| ***G06V 20/52*** | (2022.01) |
| ***H04N 23/20*** | (2023.01) |

(52) U.S. Cl.
CPC .......... *G06V 10/764* (2022.01); *G06V 10/774* (2022.01); *G06V 10/82* (2022.01); *G06V 10/98* (2022.01); *H04N 23/20* (2023.01)

(58) Field of Classification Search
USPC .......................................................... 348/143
See application file for complete search history.

(56) References Cited

U.S. PATENT DOCUMENTS

| | | | | |
|---|---|---|---|---|
| 8,511,614 | B2 * | 8/2013 | Robinson | B64G 1/1085 244/158.4 |
| 9,341,517 | B1 * | 5/2016 | Stone | G01J 1/4228 |
| 9,423,341 | B1 | 8/2016 | Jim et al. | |
| 10,740,609 | B1 | 8/2020 | Shaddix et al. | |
| 10,762,131 | B2 * | 9/2020 | White | G06F 16/437 |
| 2013/0250104 | A1 * | 9/2013 | Williams | G06T 3/4061 348/E7.085 |
| 2021/0064849 | A1 | 3/2021 | Shaddix et al. | |
| 2025/0191135 | A1 * | 6/2025 | Hendrix | G06T 7/292 |
| 2025/0278614 | A1 * | 9/2025 | Vanslette | G06N 3/045 |
| 2026/0098980 | A1 * | 4/2026 | Godwin, IV | G01V 3/38 |

OTHER PUBLICATIONS

Fitzgerald Garrett et al: "Geosynchronous satellite detection and tracking with WFOV camera arrays using spatiotemporal neural networks (Geo-SPANN)", SPIE Smart Structures and Materials + Nondestructive Evaluation and Health Monitoring, 2005, San Diego, California, United States, SPIE, US, vol. 12101, May 27, 2022(May 27, 2022), pp. 1210104-1210104, XP060160796, ISSN: 0277-786 X, DOI: 10.1117/12.2618047ISBN: 978-1-5106-4548-6.

Peng Jia et al: "Detection and Classification of Astronomical Targets with Deep Neural Networks in Wide Field Small Aperture Telescopes", arxiv.org, Cornell University Library, 201 Olin Library Cornell University Ithaca, NY 14853, Feb. 21, 2020(Feb. 21, 2020), XP081621274.

Rodriguez-Villamizar Julian et al: "Daylight Measurement Acquisition of Defunct Resident Space Objects Combining Active and Passive Electro-Optical Systems", IEEE Transactions on Geoscience and Remote Sensing, IEEE, USA, vol. 60, Jun. 1, 2022(Jun. 1, 2022), pp. 1-17, XP011911495, ISSN: 0196-2892, DOI: 10.1109/TGRS.2022.3179719 [retrieved Jun. 2, 2022].

Salvatore Nikolaus et al: "Learned Event-based Visual Perception for Improved Space Object Detection", 2022 IEEE/CVF Winter Conference On Applications of Computer Vision (WACV), IEEE, Jan. 3, 2022(Jan. 3, 2022), pp. 3301-3310, XP034086528, DOI: 10.1109/WACV51458.2022.00336.

Search Report and Written Opinion issued in International Application No. PCT/FR2023/051139, mailed Sep. 21, 2023.

Shaddix Jeff et al: "Daytime Optical Contributions Toward Timely Space Domain Awareness in Low Earth Orbit". Jan. 1, 2021(Jan. 1, 2021), XP093030794, Retrieved from the Internet: URL: https://amostech.com/TechnicalPapers/2021/SSA-SDA/Shaddix.pdf [retrieved Mar. 10, 2023].

Shaddix, J., et al., Daytime GEO Tracking with "Aquila": Approach and Results from a New Ground-Based SWIR Small Telescope System. https://amostech.com/TechnicalPapers/2019/Optical-Systems-&-Instrumentation/Shaddix.pdf.

Tao Jiang et al: "Deep Convolutional Neural Network Based Small Space Debris Saliency Detection", 2019 25 th International Conference on Automation and Computing (ICAC), Chinese Automation and Computing Society in the UK-CACSUK, Sep. 5, 2019(Sep. 5, 2019), pp. 1-6, XP033649490, DOI: 10.23919/ICONAC.2019.8895100.

* cited by examiner

[Fig. 1]
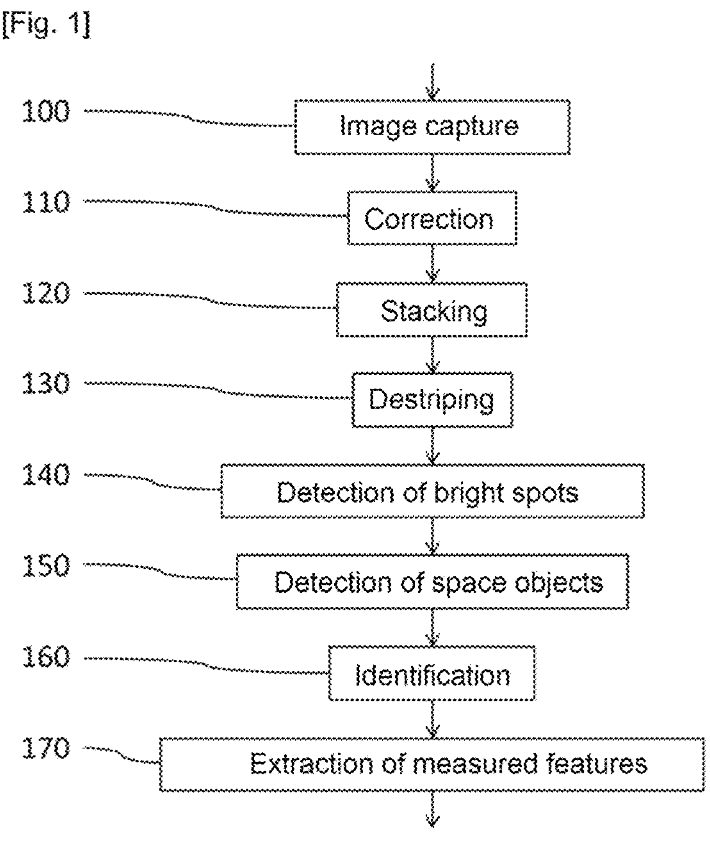
[Fig. 2]
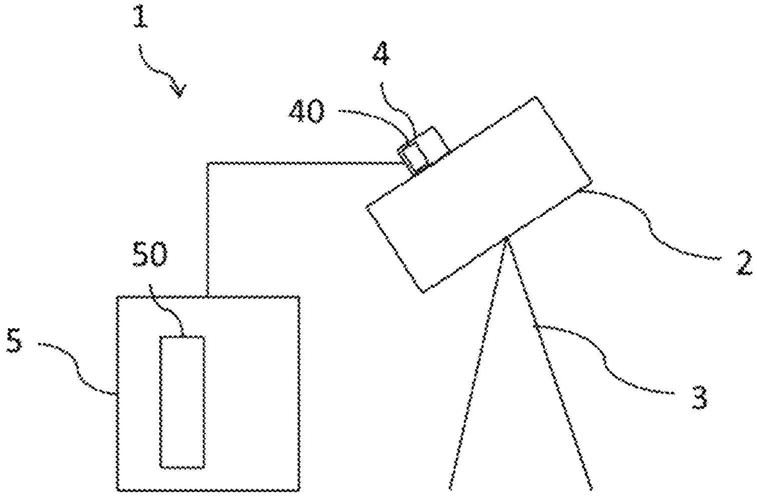

[Fig. 3]
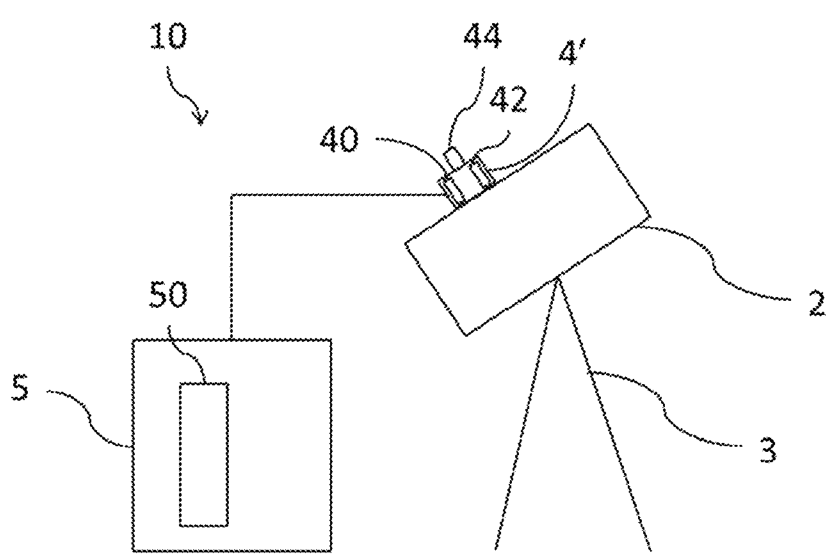

METHOD AND SYSTEM FOR DAYTIME INFRARED SPACE SURVEILLANCE

TECHNICAL FIELD

The invention relates to the surveillance of objects in orbit around the Earth using short wavelength infrared sensors during the daytime and, more particularly, to an improved surveillance method.

Such a system makes it possible to track the evolution in the trajectories of objects, to catalogue these objects and to update their trajectories.

PRIOR ART

Near Earth space is defined as the region of space extending up to several hundred thousand kilometres from the earth. Surveillance of near Earth space therefore essentially, but not exclusively, concerns the detection of objects which are in orbit around the Earth.

The context of the present invention is the observed rise in the number of objects in orbit around the Earth. These objects may be, for example, debris or operational satellites.

The large number of space objects in low earth orbit (LEO), i.e. situated between 200 km and 2000 km from the surface of the Earth, induces an increasing risk of collisions which could, in the long term, lead to an increased deterioration of the situation, but above all to risks with respect to operational space resources, whether they be military, scientific or commercial. However, each year, an increasing number of satellites are launched into orbit, making the space environment more and more congested and contested. In order to control these risks, it is of prime importance to catalogue all the potentially dangerous objects and to ascribe them valid orbital parameters enabling their trajectories to be described.

Observed from a fixed point on the Earth, space objects in low orbit have the characteristic of moving rapidly across the sky. In addition, at any given moment there are a plurality of objects crossing the sky in a plurality of places. According to these orbital parameters, each object crosses the local sky at more or less regular time intervals, ranging from several tens of minutes to several hours.

Various effects such as tide, atmospheric drag, radiation pressure and irregularities in the Earth's gravitational field affect the orbits. This prevents a precise long-term description of these orbits with an invariant set of orbital parameters.

Furthermore, the size distribution of the objects varies from a characteristic radius of several millimetres, for example residues from propulsion, paint or meteorites, to several tens of metres, in particular for satellites or artificial orbital systems, whether or not they are operational.

Performing a survey of low-orbit space objects involves:

- detecting the low-orbit space objects, without prior knowledge of their existence or their position,
- defining their trajectory or orbital parameters, with a precision suitable for the intended use,
- updating, over time, the orbital parameters of the detected objects.

It is also necessary to reacquire the same objects and to refresh the measurement of their orbital parameters regularly, in order that their precision remains suitable according to the use to which they must be put, for example to implement collision risk evaluation procedures.

Finally, the system must be capable of refining, on demand, the precision of the knowledge of the orbital parameters of a given object, so as to be able to precisely predict its position in the near future, typically in a few days, for example with a view to confirming a collision risk and planning potential avoidance manoeuvres.

Telescopes and radar systems are generally used to survey the space objects in orbit around the earth.

Although less expensive and easier to use than radar systems, ground-based telescopes are generally unable to see high-altitude satellites during the daytime because of the bright sky background.

It can also be difficult to track satellites using radar systems, because of their limited geographical distribution and their limited range.

Consequently, there are periods of time which are unobserved each day during which potentially dangerous and/or harmful space objects can manoeuvre without being detected from the ground, which could lead to loss of supervision by satellite operators and potentially endanger nearby satellites.

Ground-based optical telescopes are constrained to operate at night because of increased photon emission noise, or quantum noise, and because of the potential for saturation of the daytime sky background. Although certain ground-based systems have solved these problems, these systems are generally expensive. Space surveillance satellites can also be used during the daytime and do not encounter photon emission noise detection problems, but are also expensive and have limits because of their observation patterns, their need to deal with solar avoidance and their relatively long latency in sending tracking data to the ground. Passive, ground-based radiofrequency systems (RF) can detect resident space objects (RSO) during the daytime, but these RSO must actively transmit data to a ground-based satellite station. Consequently, the majority of RSO are not observed during the daytime, leaving near-by RSO vulnerable to dangerous and/or harmful activities.

The Graz Observatory in Austria carries out daytime laser detection of certain space objects. However, since the observation of these objects is based on visible light sensors, it is limited to very bright objects in low orbit.

As indicated in the article "Daytime GEO Tracking with Aquila: Approach and Results from a New Ground-Based SWIR Small Telescope System" from the Numerica Corporation, it is known to use short wavelength infrared waves for surveillance of space objects in orbit around the Earth. The majority of techniques using such waves use very large telescopes (greater than 1 m in diameter) and/or cryogenically cooled optical systems and have not generally been able to demonstrate a capacity to observe objects in an orbit further away than low Earth orbit during the daytime.

Systems for daytime detection of space objects in orbit around the Earth using infrared sensors are also known from documents U.S. Pat. Nos. 10,740,609 and 9,423,341.

Even though these systems have advantages compared with previously known systems, the systems described in these documents remain complex and expensive. The methods implemented involve, in particular, using telescopes that are specifically calibrated and optimised for operation in the infrared (more expensive). The methods also use complex calibration methods in order to deal with noise, in particular, methods using specific developments.

DISCLOSURE OF THE INVENTION

The main aim of the present invention is to provide a system and a method for detecting space objects in orbit around the Earth, capable of operating during the daytime and less expensive than the known systems.

One object of the invention is to propose a space surveillance method for detecting space objects in orbit around the Earth in images captured during the daytime, the method comprising the following steps:

- capturing a plurality of infrared shots of the daytime sky using a camera comprising at least one infrared sensor, each infrared shot comprising an array of pixels which are each associated with an intensity of light received by an infrared sensor,
- detecting space objects in orbit around the Earth on the basis of the captured shots,
- identifying each object detected from a catalogue of known space objects in orbit around the Earth.

According to a general feature of the invention, the step of detecting space objects in orbit around the Earth is implemented by a deep-learning artificial intelligence system, comprising a plurality of layers of artificial neural network connected together for analysing the information from the preceding layer of neurons, the step of detecting space objects in orbit around the Earth comprising:

- detecting bright spots in each shot,
- discriminating the detected bright spots, the discrimination comprising tracking each detected bright spot that is stationary in successive shots, and recording the coordinates of the detected bright spots at possibly different positions and grouped together by this tracking, the recording being performed, for each bright spot detected, following its disappearance in the following shots.

Said infrared sensor, such as a short-wave infrared camera (SWIR), provides images which can be very different from visible images in terms of noise, heterogeneity and defect features, in particular. This is why conventional detection algorithms taken directly from visible imaging applications give poor results.

In order to obtain better detection results, including on objects with poor signal-to-noise ratio (SNR), the method according to the invention comprises an artificial intelligence-based algorithm. It is based on a neural network training on a set of images specifically simulated to be as representative as possible of actual infrared images in the optical configuration used for acquiring the images. A set of actual images acquired under actual conditions with the experimental device was studied in order to construct a realistic model of noise, defects, response, background and non-uniformities. These models were then used to simulate a set of images, with a known ground truth, to use as a training set for the neural network.

By using a deep-learning artificial intelligence for processing the infrared images, the method according to the invention has the advantage of being able to operate on the basis of a simple calibration carried out with a view of the sky which does not require a specific module or development.

Deep learning is one of the leading technologies of machine learning, implementing algorithms capable of mimicking the actions of the human brain, using artificial neural networks consisting of tens or even hundreds of "layers" of neurons, each receiving and interpreting the information of the preceding layer. Deep learning networks are trained on the basis of complex data structures which they encounter.

The method according to the invention also has the advantage of being able to be used by a system dedicated to a conventional reflecting telescope which has not been optimised for operation with short wavelength infrared waves. The camera can thus easily enable space surveillance to be carried out, from the Earth, for detecting space objects in orbit around the Earth in images captured during the daytime.

In a first embodiment of the surveillance method according to the invention, the layers of artificial neural networks can be calibrated, prior to their use for detecting space objects (satellites, debris, stars etc.) present in the infrared images, by a supervised learning method based on a different database of images enabling the artificial intelligence system to determine typical features of a space object (features differentiating a bright spot corresponding to an actual space object from the image background of hot pixels, electronic noise, etc.).

In a second embodiment of the surveillance method according to the invention, the method can further comprise, immediately after the capture of shots, an application of a non-uniformity correction in the captured shots.

In a third embodiment of the surveillance method according to the invention, the method can further comprise filtering of each stacked image obtained.

In a fourth embodiment of the surveillance method according to the invention, the method can further comprise training of stacked images from a superposition of a plurality of said shots, each pixel of a stacked image being associated with a received intensity of light corresponding to the average of the intensities of the superimposed shots for the same pixel, the detection of space objects using the stacked images as shots to be processed.

In a fifth embodiment of the surveillance method according to the invention, the method can further comprise, before the step of detecting space objects in orbit around the Earth, a destriping step of each stacked image in order to remove streak defects in the stacked image.

Another object of the invention proposes a space surveillance system for detecting space objects in orbit around the Earth, the system comprising a reflecting telescope mounted on a mechanical support with motorised displacement, a camera comprising at least one infrared sensor mounted at the output of the reflecting telescope and configured to take series of shots of the daytime sky at a frequency between 1 Hz and several hundred Hertz, and a processing unit receiving each shot captured by the camera.

According to a general feature of the space surveillance system according to the invention, the processing unit can comprise a deep-learning artificial intelligence system comprising a plurality of layers of artificial neural network connected together in order to analyse the information of the preceding layer of neurons, the processing unit being configured to carry out the following steps based on the received images:

- detecting space objects in orbit around the Earth on the basis of the captured shots, the detection being carried out by the deep-learning artificial intelligence system, and
- identifying each object detected from a catalogue of known space objects in orbit around the Earth,
- the detecting of space objects in orbit around the Earth comprising detecting bright spots in each shot, and discriminating the detected bright spots, the discrimination comprising tracking of each detected bright spot that is stationary in successive shots, and recording the coordinates of the detected bright spots at possibly different positions and grouped together by this tracking, the recording being performed, for each bright spot detected, following its disappearance in the following shots.

In an embodiment of the space surveillance system, the camera can further comprise at least one visible light sensor mounted at the output of the reflecting telescope and configured to take series of shots of the night sky, the space surveillance system further comprising a day/night alternation module making it possible to change the type of sensor receiving the light from the sky as a function of the environmental light intensity.

BRIEF DESCRIPTION OF THE DRAWINGS

Other features and advantages of the present invention will become apparent from the description given below, with reference to the appended drawings which illustrate an exemplary embodiment that is in no way limiting.

FIG. 1 represents a space surveillance method according to an embodiment of the invention.

FIG. 2 represents a space surveillance system according to a first embodiment of the invention.

FIG. 3 represents a space surveillance system according to a second embodiment of the invention.

DESCRIPTION OF THE EMBODIMENTS

FIG. 2 schematically represents a space surveillance system according to a first embodiment of the invention.

The space surveillance system 1 is configured to detect space objects in orbit around the Earth. The system 1 comprises a reflecting telescope 2 mounted on a mechanical support 3 with motorised displacement, a camera 4 mounted at the output of the reflecting telescope 2 and comprising at least one infrared sensor 40, and a processing unit 5 receiving each image captured by the camera 4.

The camera 4 is configured to take series of shots of the daytime sky at a frequency between 1 Hz and several hundred Hertz. The exposure time for each shot is adjusted in order to limit the saturation of the infrared sensor 40.

The processing unit 5 comprises a deep-learning artificial intelligence 50 comprising a plurality of layers of artificial neural network connected together to analyse the information of the preceding layer of neurons. The processing unit 50 is configured to implement a space surveillance method in the images captured during the daytime.

FIG. 1 represents such a surveillance method according to an embodiment of the invention.

In a first step 100 of the method, a plurality of infrared images of the sky are captured during the daytime using the camera 4 and its infrared sensor 40. Each infrared image comprises an array of pixels which are each associated with an intensity of light received by the infrared sensor.

In a second step 110 of the method, a correction is performed of the non-uniformity of response of the pixels for each captured image. This correction is made via the prior acquisition of a uniform reference image, acquired directly over the sky in a region devoid of luminous objects (stars or satellites). This calibration does not require dismantling the sensor or additional equipment.

In a subsequent step 120 of the method, stacks are produced of a plurality of successively captured images. The resulting stacked image is produced by the superposition of the infrared images of the stack. Each pixel of a stacked image is associated with a received intensity of light corresponding to the average of the intensities of the superimposed infrared images for the same pixel.

In a subsequent step 130, destriping is then carried out for each stacked image. The destriping can remove the streak defects which may appear in the stacked image because of the superposition the infrared images.

In a subsequent step 140, a detection of bright spots, or "plot detection", is carried out on each of the destriped stacked images. This step consists of extracting the bright spots from the background noise.

This step 140 of detecting bright spots can be preceded by a conventional (averaging type) image filtering, in order to reduce the background noise and to improve the detection performance.

The step 140 of detecting bright spots is implemented by the deep-learning artificial intelligence system 50 comprising a plurality of layers of artificial neural network connected together to analyse the information of the preceding layer of neurons.

In a subsequent step 150, the bright spots detected in the preceding step 140 are discriminated into stars or satellites. This discrimination comprises tracking detected bright spots that are stationary in the images (these stationary points therefore belong to the same space object). Then, once all the points from a given space object are listed, the coordinates of the bright spots detected at potentially different positions and grouped together by this tracking are recorded. In other words, the recording is made once the bright spots detected disappear in the following images The detection of space objects in step 150 thus makes it possible to obtain the space objects in orbit around the Earth present in the images.

In a subsequent step 160, the detected objects are compared with the objects listed in a catalogue of known space objects in orbit around the Earth. The catalogue lists the known space objects in orbit around the Earth indicating the various features of the space object: its dimensions, its orbit, and various intrinsic features.

In a subsequent step 170, new features are the extracted from the objects detected in the stacked images, in order to update the information relating to this space object if it is already listed in the catalogue, or to add a new space object to the catalogue.

The layers of artificial neural networks are calibrated, prior to their use for detecting space objects (stars, satellites, debris, etc.), by a supervised learning method from a base of various images enabling the artificial intelligence system to determine the typical features of a space object (stars, satellites, debris, etc.). The calibration is performed on a set of simulation images which were generated in order to reproduce typical images from the sensor. Each simulation image comprises a background and the background noise, bright plots corresponding either to stars or to space objects or to sensor defects. With each image thus created is associated its truth, i.e. the positions of actual objects in the image (stars and satellites). A large number of images is created in this way and serves as a training base for the neural network.

The present invention thus makes it possible to provide a system and a method for detecting space objects in orbit around the Earth, capable of operating during the daytime and less expensive than the known systems.

The invention claimed is:

1. A space surveillance method for detecting space objects in orbit around Earth in images captured during daytime, the method comprising:

capturing a plurality of infrared shots of a daytime sky using a camera comprising at least one infrared sensor, each infrared shot comprising an array of pixels which are each associated with an intensity of light received by an infrared sensor, detecting space objects in orbit around the Earth on a basis of said shots, identifying each object detected from a catalogue of known space objects in orbit around the Earth, the method being characterised in that the step of detecting space objects in orbit around the Earth is implemented by a deep-learning artificial intelligence system comprising a plurality of layers of artificial neural network connected together in order to analyse information from a preceding layer of neurons, the deep-learning artificial intelligence system being based on simulation images generated in order to reproduce typical images coming from the infrared sensor and comprising a background and a background noise, spots of light corresponding either to stars or to space objects or to defects of the infrared sensor, each simulation image being associated with a truth based on positions of real objects in the image, and the step of detecting space objects in orbit around the Earth comprising:

detecting bright spots in each shot, discriminating the detected bright spots, the discrimination comprising tracking each detected bright spot that is stationary in successive shots, and recording coordinates of the detected bright spots at possibly different positions and grouped together by this tracking, the recording being performed, for each bright spot detected, following its disappearance in the following shots.

2. The method according to claim 1, wherein the layers of artificial neural networks are calibrated, prior to their use for detecting space objects, by a supervised learning method, using a base of various images enabling the artificial intelligence system to determine typical features of a space object.

3. The method according to claim 1, further comprising, immediately after capturing shots, applying a non-uniformity correction to the captured shots.

4. The method according to claim 1, further comprising filtering each shot.

5. The method according to claim 1, further comprising forming stacked images from a superposition of a plurality of said shots, each pixel of a stacked image being associated with a received intensity of light corresponding to an average of the intensities of the superimposed shots for the same pixel, the detection of space objects using the stacked images as shots to be processed.

6. The method according to claim 5, further comprising, before the step of detecting the bright spots, a destriping step of each stacked image in order to remove streak defects in the stacked image.

7. A space surveillance system for detecting space objects in orbit around Earth, the system comprising a reflecting telescope mounted on a mechanical support with motorised displacement, a camera comprising at least one infrared sensor mounted at an output of the reflecting telescope and configured to take series of shots of a daytime sky at a frequency between 1 Hz and several hundred Hertz, and a processing unit receiving each shot captured by the camera, characterised in that the processing unit comprises a deep-learning artificial intelligence system comprising a plurality of layers of artificial neural network connected together to analyse information of a preceding layer of neurons, the processing unit being configured to carry out the following steps based on received images:

detecting space objects in orbit around the Earth on a basis of the captured shots, the detection of bright spots being performed by the deep-learning artificial intelligence system, and identifying each object detected from a catalogue of known space objects in orbit around the Earth, the detecting of space objects in orbit around the Earth comprising detecting bright spots in each shot, and discriminating the detected bright spots, the discrimination comprising tracking each detected bright spot that is stationary in successive shots, and recording coordinates of the detected bright spots at possibly different positions and grouped together by this tracking, the recording being performed, for each bright spot detected following its disappearance in the following shots.

8. The space surveillance system according to claim 7, wherein the camera further comprises at least one visible light sensor mounted at the output of the reflecting telescope and configured to take series of shots of a night sky, the space surveillance system further comprising a day/night alternation module making it possible to change a type of sensor receiving the light from the sky as a function of an environmental light intensity.

* * * * *